United States Patent [19]

Owens

[11] Patent Number: 4,476,263

[45] Date of Patent: Oct. 9, 1984

[54] ADHESION PROMOTERS FOR SANITARY CAN COATINGS

[75] Inventor: Phillip M. Owens, Strongsville, Ohio

[73] Assignee: SCM Corporation, New York, N.Y.

[21] Appl. No.: 554,687

[22] Filed: Nov. 23, 1983

[51] Int. Cl.$^3$ .................. B65D 1/12; B44D 1/50; C09D 3/58; C09D 5/40

[52] U.S. Cl. .................. 523/426; 428/416; 428/418; 523/100; 523/451; 523/453; 523/455; 524/394

[58] Field of Search ............ 523/100, 426, 451, 453, 523/455; 524/394; 428/416, 418

[56] References Cited

U.S. PATENT DOCUMENTS

| | | | |
|---|---|---|---|
| 3,997,694 | 12/1976 | Wu | 428/418 |
| 4,127,451 | 11/1978 | Marceau et al. | 428/416 |
| 4,212,776 | 7/1980 | Martinez et al. | 428/418 |
| 4,278,718 | 7/1981 | Billings et al. | 523/100 |
| 4,289,674 | 9/1981 | Christenson et al. | 428/418 |

Primary Examiner—Ronald W. Griffin
Attorney, Agent, or Firm—A. Joseph Gibbons

[57] ABSTRACT

Certain alkali metal salts of organic diacids having one or more hydroxyl functional groups, as for example sodium and potassium citrate, provide improved adhesion of organic coatings electrodeposited on metal substrate. The new sanitary coatings are particularly useful for untreated aluminum and aluminum alloy cans used in the packaging of various food products including acidic foods like tomatoes, corn, and green beans which require in-can-sterilization.

5 Claims, No Drawings

ADHESION PROMOTERS FOR SANITARY CAN COATINGS

The invention relates to sanitary coatings and to improved adhesion of electrodeposited coatings on aluminum or aluminum alloys. The improved process and composition allows untreated aluminum to be coated with various organic coatings while retaining excellent adhesion properties. A related case by the same inventor (Ser. No. 554,691) is being filed simultaneously herewith.

BACKGROUND OF THE INVENTION AND PRIOR ART

In the early years of aluminum metal it was believed that aluminum did not require painting. Current technology, quite to the contrary, strongly recommends painting of aluminum surfaces together with rather elaborate steps for pretreating the metal, i.e. alkaline washings, degreasing, deoxidizing, oxidizing, conversion coatings, inhibitive rinsings and the like prior to application of the organic polymer or resin paint. Aluminum and its alloys require various preparation and cleaning, depending on the end use of the product, before a coating is applied. Soil, grease, scale, oil and other materials are usually removed by pre-cleaners, vapor degreasers, emulsion cleaners, solvent cleaners, power or mechanical washer cleaners and tumbling cleaners. Intermediate or final cleaning may precede other treatments such as alkali etches, deoxidizers, conversion coatings, burnishing compounds or cutting compounds to produce satisfactory finishes. Such operations are quite elaborate and often costly.

There is renewed interest in electrocoating aluminum cans for food items which are processed by sterilization at about 260° F. for a period of 90 minutes. Aluminum cans and aluminum alloy cans have desirable physical properties which make them attractive for use as food containers. In order to make the aluminum cans cost competitive with other food containers, can manufactures would prefer to deposit the protective organic coating on the untreated metal substrate thereby eliminating the conventional treatments such as deoxidizing, oxidizing, conversion coating, etc, as currently practiced in the art. Considerable cost savings could be effected by using untreated metal.

Substantially all commercially finished aluminum is chemically pretreated prior to the application of organic top coats. After degreasing, cleaning, and oxidizing, various conversion coatings are applied to the aluminum surface. These treatments include: (1) chromephosphate; (2) chrome-oxide; (3) crystalline (zinc) phosphate; and (4) amorphous (iron) phosphate. The adhesion of paint films to aluminum pretreated with these conversion coatings are rated excellent to fair in the order shown. For sanitary containers such as aluminum food and beverage cans, the prior art chrome-phosphate pretreatments provide superior adhesion of organic top coats. A particular disadvantage of this pretreatment is that rinses must be waste treated to reduce hexavalent chrome and subsequently remove trivalent chrome and fluorides. Typical procedures require a reduction step (sulfur dioxide or bisulfite) and a precipitation with lime. After filtration, the wet cake must be transported to a sanitary land fill. Because of the cost factor and environmental requirements in handling cleaners, rinses, and conversion coatings and the necessity of disposing of residuals, it is desired to provide a working process which eliminates one or more of these precoating steps. Unfortunately, when such pretreatments are eliminated the resulting coatings usually suffer from partial or total adhesion loss, especially when coated cans are used for various foods which require in-can sterilization.

Many approaches have been used to improve the adhesion or organic coatings to aluminum or its alloys. The etch treatment with a mixture of sulfuric acid and chromium trioxide or sodium dichromate in water is quite old. The patent literature shows various means for enhancing adhesion of aluminum coatings. For example, Hofstatter, U.S. Pat. No. 4,208,223, teaches the use of epoxy functional silanols to treat aluminum surfaces as a separate step prior to painting but subsequent to a cleaning step, a deoxidizing step, and an oxidizing step. In the Hofstatter patent the cleaner can be an alkaline metal borate cleaner and the oxidation can be by chromic acid at low pH.

U.S. Pat. No. 4,243,707 (Wiggins) teaches the condensation of certain metal hydroxides or borates with certain ethylene oxide phosphate emulsifiers to provide adhesion promoters for coating metal substrates with an acrylonitrite copolymer latex.

U.S. Pat. No. 4,180,620 (Inskip) teaches the use of 0.01–0.5 weight percent magnesium, zinc, lead or calcium salts of neodecanoic acid to improve the adhesion of plasticized poly (vinyl butyral) sheets to glass, especially in laminates. These salts are applied to the sheets as a solution optionally containing anionic or non-ionic surfactants during extrusion of the sheets.

In Japanese patent application JP No. 7543799, M. Kaibu et al (C.A. 86(10)56875g) teach the immersion of an anodized aluminum alloy in an aqueous solution (0.1–50%) of a hydroxycarboxylic acid or its ammonium salt prior to electrophoretic deposition of a water-soluble acrylic resin. Coatings with improved bonding strengths result using immersion treatments of ammonium salts of tartaric and citric acid.

A similar Canadian Patent, CA No. 996497, to W. Friedman and H. G. Gerascheid, uses an aqueous solution containing 0.0005–0.5 g hydroxycarboxylic acid (citric acid) or its water-soluble salt for sealing the previously anodized aluminum surface.

B. W. Samuels, K. Sotomdek and R. Foley (*Corrosion*, Vol. 37, No. 2, pp. 92–93, 1971) have attempted to address the problem of corrosion of aluminum alloy 2024-T3 and have evaluated various potential inhibitors. In a controlled experiment certain treatments were applied to the metal substrate prior to a 14-day immersion test using an air saturated solution of 0.1N sodium chloride at room temperature. Test results show that sodium salts of citric acid and tartaric acid not only failed as corrosion inhibitors but indeed gave accelerated corrosion at certain concentrations. This is particularly interesting in view of the instant invention where similar organic acid salts are found to be highly effective for promoting adhesion of organic coatings to metal when the salts are prepared from multivalent salts.

Coatings, as for example epoxy and acrylic coatings, can be applied by electrocoating methods, quite often, where the substrate serves as the anode and the electrocoating tank serves as the cathode. The electrodeposition process, also referred to as electrophoresis, electrocoating, electropainting and by other names is described in some detail by M. W. Ranney in a chapter "Electrodeposition and Waterborne Coatings", Chemical Technology Review No. 97 on pages 47–91, (Noyes Data Corp., 1977). By electrodeposition is meant a process whereby aqueous compositions, including solutions, dispersions or suspensions, containing from one to 25 percent by weight of film former (resin), and usually less than 10 percent, comprises a bath in an electrocoating tank. The object to be coated and the tank are connected to opposite terminals of a high current, low voltage (up to 200 volts) DC supply. Current passes through the bath and deposits a semi-solid plastic layer on the object. The coated part is withdrawn from the bath, washed with clear water and baked in an oven to form a solid coating film on the object. These coatings can serve as prime coatings or for single coat applications. Aluminum cans, when so coated, and subjected to the required sterilization processing (90 minutes at 260° F.) exhibit poor adhesion. Foods such as tomatoes, corn, and green beans adversely affect the adhesion of the epoxy-acrylic coatings. These difficulties have been overcome by the addition of selective adhesion promoters to the electrocoating formulations.

BRIEF STATEMENT OF THE INVENTION

One object of the present invention is an electrodeposition process and composition for coating untreated metal cans, including aluminum and aluminum alloy cans, so that they can be used for food products which require sterilization processing at high temperatures.

Another object is to provide adhesion promoters for such organic coatings, including epoxy or acrylic coatings, which can be applied to untreated metal cans by electrodeposition.

A further object is a method for improving the adhesion of water-base paints to an untreated aluminum substrate which comprises:

(a) cleansing the aluminum surface with an aqueous acid wash and water washing said cleaned surface (b) subjecting the cleaned aluminum to an electrocoating paint composition comprising an epoxy or acrylate resin, a cross-linking agent and about 0.01 to about 2.0 parts, basis total resin, of an adhesion promoter selected from the group consisting of one or more alkali metal salts of a non-aromatic organic acid having at least two acid functional groups and one or more hydroxyl functional group (c) electrodepositing said composition to deposit a film coating on said substrate (d) curing said deposited film.

DETAILED DESCRIPTION OF THE INVENTION

The ability of coatings to form adherent films on various metal substrates is complicated when such coatings have to undergo such rigorous exposure as coatings that are used for food contact. Coatings that must withstand 250° F.–260° F. processing in various foods require excellent adhesion to the metal surface. In many cases the metal must be treated chemically in some manner to enhance the adhesive properties of the coating to the metal. When metals such as aluminum are not treated, the adhesion properties of most coatings are usually unsatisfactory.

This invention overcomees the adhesion problems of organically electrocoated food cans made from cleaned, untreated aluminum and aluminum alloy cans. Certain metal salts of organic acids, when added to electrocoat formulations, improve the adhesion of the coating to metal cans and allow such cans to contain food packed with high water content, especially acidic foods like tomatoes. The effective metal salts are the alkali metal salts, especially the sodium and potassium salts. Of course, the choice and use of particular metal salts or mixtures will be governed by their physical properties, solubility and leachability in the specific food product medium. It is important to monitor such properties and evaluate their influence on the taste of particular food or beverage. The sodium salts are most preferred especially since a number of the useful adhesion promoters have been approved for food contact use. The effective metals are selected from the group known as the alkali metals.

Organic coatings having improved adhesion can be obtained by adding to the organic coating, from about 0.02 to about 2.0 percent of selected salts, for example sodium citrate, potassium citrate or sodium benzenesulfonate. Cans protected with such coatings can be used for the containment of such foods as tomatoes, corn, dog food and green beans which are usually sterilized by heating for about 90 minutes at 250° F.

The metal salts may be prepared from a variety of organic acids in the usual fashion. Organic acids suitable for forming metal salt adhesion promoters, advantageously have a multiplicity of acid functional groups. Such functional groupsinclude the carboxylic acid group

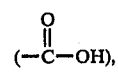

the phosphoric acid group

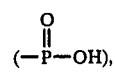

the sulfonic acid group (SO$_3$H) and mixtures thereof.

Suitable organic acids having acid functionality useful as metal salts in the instant invention include citric acid, tartaric acid, malic acid, gluconic acid, glycollic acid, lactic acid, maleic acid, and the like. Preferred as adhesion promoters are the salts of citric acid and most preferred is sodium citrate.

Metal salts of various hydroxy acids can be employed as adhesion promoters. Suitable hydroxy acids include such compounds as salicylic acid, glycollic acid, -hydroxy butyric acid, dimethylol propionic acid, mandelic acid, 2-hydroxy-3-methylbenzoic acid, lactic acid, gallic acid, 2,4-dihydroxy-benzoic acid, 1-hydroxy-2-naphthoic acid, 2-hydroxy-1-naphtoic acid, and other aliphatic and aromatic hydroxyl-containing carboxylic acids. For some applications carboxylic acids containing phenolic hydroxy groups ae useful in the practice of the present invention. These usually impart some degree of alkali resistance and other desirable properties to the coatings. A preferred hydroxy group containing acid is salicylic acid. The preferred acids for preparing adhesion promoter salts are soluble or partially soluble in water. Certain advantages can result from the use of mixtures of metal salts of more than one carboxylic acid, as for example, the mixture of sodium citrate with potassium salicylate.

Not all salts are effective. Those made fron stronger inorganic acids, appear to be detrimental for adhesion when they are incorporated in a similar manner in the epoxy-acrylic electrocoat. A typical epoxy electrocoat composition contains 100 parts of epoxy-acrylic resin composition (28% solids), 5 parts of crosslinking agent, 300 parts water, and 0.03 parts sodium citrate. Of course, the epoxy electrocoat will usually contain the usual additives and solvents such as phenolic resins, cylcohexanol, butyl cellusolve, and amine neutralizing or solubilizing agents such as for example dimethylethanolamine. Sodium acetate is considerably less effective than sodium citrate as an adhesion promoter. Apparently, the more acidic anions disrupt the adhesive layer between the organic coating and the metal surface.

By untreated aluminum is meant aluminum metal or alloy suitable for use as a substrate for paint or coating, including deposition by electrocoating processes and which do not require a specific surface treatment other than one or more steps for washing, cleaning, including mechanical cleaning, and/or drying steps. Thus, untreated aluminum would specifically exclude deoxidizing, oxidizing, conversion coatings, flame cleaning, phosphatizing and the like prior to the application of the paint or coating. Chemical treatments, other than simple washing treatments, are excluded from the term "untreated aluminum" as are surface destructive treatments such as prior anodizing treatments. Anodic oxidation is an electrochemical process in which the oxide film is increased in thickness basically by making the anode in a cell containing a suitable electrolyte to produce oxide coatings. Also excluded are those produced by chemical conversion coatings, i.e. chromate, carbonate, phosphate and zinc immersion coatings.

Aluminum substrates useful in the present invention include pure aluminum and other aluminum products such as aluminum alloys containing up to 30 percent of alloying metals. High purity aluminum is soft and lacks strength. Through the addition of small amounts of other elements, alloys having high strength-to-weight ratios can be formed, worked and can accept a wide variety of finishes. Markets for coated aluminum include the building and construction industry. For example, alloys such as 3003, 3004, 3105 and others are used for residential siding, industrial roofing and siding, and form roofing and siding. Gutters and downspouts are also fabricated from these alloys. For beer and beverage cans, alloys, as for example, 3004 and 5182 are used for can bodies and ends respectively. The aluminum substrates most desirable for sanitary cans for the containment and processing (sterilization) of various foods are the aluminum alloys containing copper, silicone, manganese, magnesium and combinations thereof. Such aluminum substrates are not restricted to any particular size or shape. In the best mode examples an aluminum alloy designated as ALCOA 5042 was used as the untreated aluminum.

Although the preferred coating for electrodeposition on aluminum are epoxy-acrylic resin coatings in latex or water-dilutable form, other common organic coatings known to the art may be advantageously used. These additional polymeric materials, usually prepared by vinyl polymerization, include for example various polymeric materials which have reactive sites so that they are heat reactive with typical crosslinking agents used in the present invention. Such reactive sites include one or more of carboxyl groups, alcoholic hydroxyl groups and/or amine groups and the like. Phenolic alcoholic groups may be used in partial or total replacement of the alcoholic function in the polymer preparation. For food coatings water-based epoxy, water-based acrylic, high solids oleoresins, polyester, epoxy and vinyl are quite common. From an ecological and cost standpoint water-based acrylics and water-based epoxies are recommended. Hybrid systems such as epoxy-acrylics and epoxy-phenolics and various mixtures are most preferred for internal can coatings when formulated in dispersions, emulsions and latices.

One advantage of the instant process is that it eliminates pretreatment steps which not only are time consuming but more importantly are quite expensive. In preparing the aluminum substrate for electrocoating the substrate should be cleaned of oil, grease and surface impurities and films. Simple cleaning by washing in a solution of commonly used surfactants or detergents is satisfactory followed by rinsing with water and drying. Often an acid wash (Ridoline 24, Amchem Corp.) and water rinse is sufficient for the application of high adhesion coatings.

The invention is further illustrated by the following best mode examples but these examples should not be construed as limiting the invention. All parts shown are parts by weights and temperatures are given in degree Fahrenheit unless otherwise indicated.

EXAMPLE 1

A standard epoxy-acrylic electrocoating paint (28% solids) was formulated to contain 54 percent epoxy resin, 24 percent acrylic, 8 percent phenolic and 14 percent melamine crosslinking agent (Cymel 303, trademark of American Cyanamid). This composition was used as a base to evaluate various adhesion promoter candidates in the following formulation:

|  | Parts | | |
|---|---|---|---|
|  | A | B | C |
| epoxy acrylic resin | 400 | 400 | 400 |
| calcium dodedecyl benzene sulfonate | — | 0.6 | — |
| calcium citrate | — | — | 0.12 |
| deionized water | 1,129 | 1,129 | 1,129 |
| dimethylethanolamine | 6 | 6 | 6 |

Adhesion tests (experiments) were conducted using 5"×4" panels of aluminum alloy no. 5042 (Alcoa) having a thickness of 0.0009 inches. Drawn aluminum is given an aqueous acid wash with Ridoline 24 (Amchem Corporation), then rinsed well with water before electrocoating. For deposition of the organic coating the panels were immersed in an electrocoating bath containing the epoxy-acrylic paint at 8% solids and electrocoated at 100 V. for a period of ½–1 second. The panels were immediately removed from the bath, rinsed with deionized water and oven cured by heating at 4 or 8 minutes at various temperatures such as 380° F., 400° F., 420° F. The coated panels were then subjected to a sterilization treatment in water at 250° F. for 90 minutes. Each panel was evaluated by visual observation and by the cross-hatch adhesion test. The results for the A, B, C compositions are shown in Table 1 where coated untreated aluminum panels are compared with control aluminum panels which were pretreated before application of the organic coating. Referring to Table I it is seen that severe adhesion loss occurs only in the formulations where untreated aluminum is electrocoated with a paint composition containing no adhesion promoter (A). No adhesion loss is observed when the system contains either calcium citrate (c) or calcium dodecyl-benzene sulfonate (B) as the adhesion promoter.

ited as acid number of #69. The master batch, having 8 percent solids, was formulated as follows:

| Epoxy/Acrylic/Phenolic Emulsion | 2,500 |
|---|---|
| Cymel 303 | 142 |
| Cyclohexanol | 142 |
| Dimethylethanolamine | 23.5 |
| DI H$_2$O | 8,966 |

Various acidic salts were evaluated as adhesion promoters for the master batch electrocoating bath, usually as a 20 percent solution of the salt in water. The various formulations designated as Examples 2 through 8 are shown in Table II. Each bath was electrocoated on cleaned, untreated aluminum to give about 5 mg/in$^2$ coating when applied at 100 volts for 1.5 seconds. Panels were baked for 4 minutes at temperatures of 380° F., 400° F., and 420° F. (Peak Metal Temperature) and then processed in stewed tomatoes for 90 minutes at 250° F. The adhesion results using the adhesion promoters are compared in Table III with the master batch using no adhesion promoter. Each test panel was rated on a scale of 0–10; a zero (0) rating indicates no adhesion loss wherein a 10 rating indicates 100 percent adhesion loss or failure. From Table III it is seen that sodium malate, magnesium citrate and sodium citrate are excellent adhesion promoters when the coated panels are baked at 380° F., 400° F., or 420° F. prior to processing stewed tomatoes for 90 minutes at 250° F. In contrast the sodium salt of benzoic acid affords practically no protection even when the films are cured at 420° F. bake. Similarly sodium salicylate gives only a minor degree of protection under similar conditions.

TABLE I

| | | CURE CONDITIONS | | | | | |
|---|---|---|---|---|---|---|---|
| | | 400° F./8 min. | | 400° F./4 min. | | 420° F./8 min. | |
| Test No. | Pretreatment | Blush*** | Adhesion** | Blush*** | Adhesion** | Blush | Adhesion |
| Control A | Treated Aluminum | — | 0 | — | — | 0 | 0 |
| Control B | Treated Aluminum | 0–1 | 5 | 0–1 | 8 | 0 | 0 |
| Control C | Treated Aluminum | 0–1 | 0 | 0–1 | 0 | 0 | 0 |
| A | Untreated | 1–2 | 5–6* | 2–3 | 10* | 0 | 0 |
| B | Untreated | 1–2 | 0 | 2–3 | 0 | 0 | 0 |
| C | Untreated | 2 | 0 | 3 | 0 | 0 | 0 |

*adhesion failure only on inside of can
**10 = 100% adhesion loss; 0 = no loss of adhesion
***blush rating: 0–10; 0 = no blush; 10 = totally opaque white

EXAMPLES 2–8

A master batch of epoxy-acrylic-phenolic resin was prepared with Epon 1004 Epoxy resin having a molecular weight of approximately 1,900 as opposed to Epon 1007 Epoxy (mol. wt. about 3,600) used in the foregoing example. Panels coated with this composition was quite susceptible to adhesion failure when processed in stewed tomatoes for 90 minutes at 250° F. The resin, as an emulsion (31.5% solids), contained 64 percent Epoxy 1004, 27 percent acrylic, 9 percent phenolic and exhib-

TABLE II

Evaluation of Various Organic Acid Salts in Master Batch

| Components | Ingredients (Parts by Weight) | | | | | | |
|---|---|---|---|---|---|---|---|
| (Example No.) | 2 | 3 | 4 | 5 | 6 | 7 | 8 |
| Master Batch (Control) | 1,200 | 1,200 | 1,200 | 1,200 | 1,200 | 1,200 | 1,200 |
| Sodium Malate* | 0.75 | — | — | — | — | — | — |
| Sodium Lactate* | — | 0.75 | — | — | — | — | — |
| Sodium Salicylate** | — | — | 0.75 | — | — | — | — |
| Calcium Dodecyl* benzene sulfonate | — | — | — | 0.75 | — | — | — |
| Magnesium Citrate*** | — | — | — | — | 0.14 | — | — |
| Sodium Citrate* | — | — | — | — | — | 0.75 | — |
| Sodium Benzoate* | — | — | — | — | — | — | 0.75 |

*As 20 Percent Solution in Water
**20 Percent in Isopropanol: Water (75:25)
***100 Percent Solids

TABLE III

Comparison of Various Adhesion Promoters
(Processed in Tomatoes 90 Minutes at 250° F.)

| Example No. | Cure Conditions (Peak Metal Temperature) | | |
|---|---|---|---|
| | 380° F./4 Min. | 400° F./4 Min. | 420° F./4 Min. |
| Control** | 9-10 | 9-10 | 9-10 |
| 2 | 0 | 0 | 0 |
| 3 | 8-9 | 4-5 | 0-1 |
| 4 | 5-7 | 7-8 | 2-3 |
| 5 | 9-10 | 5-7 | 8-9 |
| 6 | 0 | 0 | 0 |
| 7 | 0 | 0 | 0 |
| 8 | 9-10 | 9-10 | 9-10 |

*0 = No Adhesion Loss 10 = 100% Adhesion Loss
**Master Batch with no Adhesion Promoter Additive

What is claimed is:

1. A coating composition suitable for application to metal substrate such as aluminum and aluminum alloy without previous surface treatment thereof, which comprises an aqueous dispersion or solution of an epoxy-acrylic resin having sufficient functional groups capable of being crosslinked with a melamine or glycoluril type crosslinker, a crosslinking amount of said melamine or glycoluril and about 0.01 to about 2.0 weight percent of an adhesion promoter, said adhesion promoter being an alkali metal salt of a non-aromatic organic acid having at least two acid functional groups and one or more hydroxyl functional groups.

2. An aluminum alloy can coated with the composition of claim 1.

3. A method for improving the adhesion of water-base paints to an untreated aluminum substrate which comprises
   (a) cleansing the aluminum surface with an aqueous acid wash and water washing said cleansed surface
   (b) subjecting the cleaned aluminum to an electrocoating paint composition comprising an epoxy-acrylate resin, a crosslinking agent and about 0.01 to about 2.0 parts, basis total resin, of an adhesion promoter selected from the group consisting of one or more alkali metal salts of a non-aromatic organic acid having at least two acid functional groups and one or more hydroxyl functional groups
   (c) electrodepositing said composition to deposit a film coating on said substrate
   (d) curing said deposited film.

4. An aluminum alloy can coated by the process of claim 3.

5. A method according to claim 3 wherein the adhesion promoter is sodium citrate.

* * * * *